May 5, 1953            E. P. BATTAGLIA            2,637,508
ANTIBACKLASH ATTACHMENT FOR FISHING REELS
Filed March 8, 1951
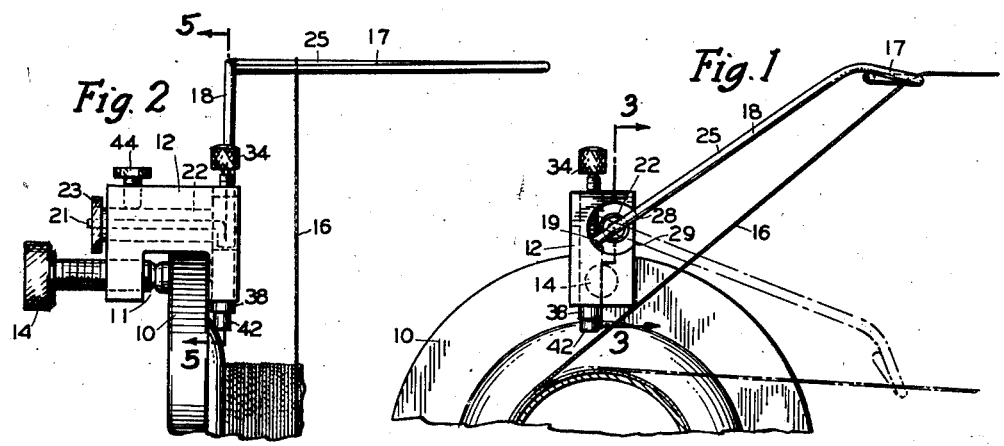
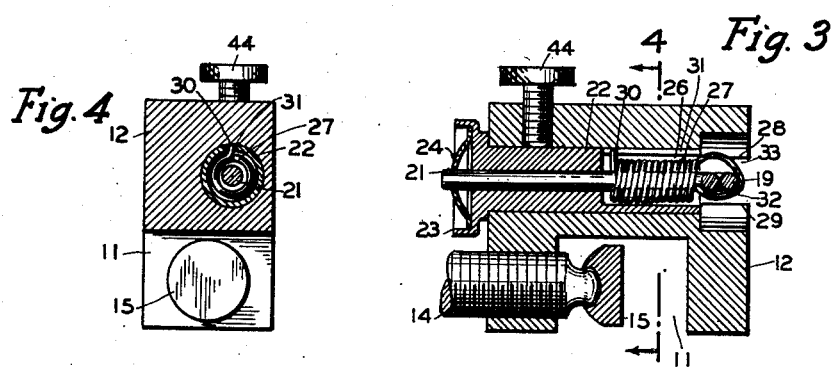
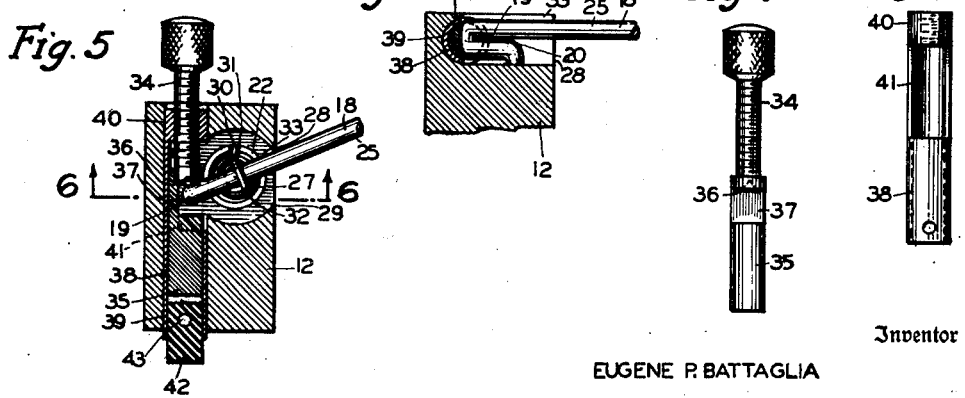
Inventor
EUGENE P. BATTAGLIA
By Harry Jacobson
Attorney Patented May 5, 1953

2,637,508

UNITED STATES PATENT OFFICE 2,637,508

ANTIBACKLASH ATTACHMENT FOR FISHING REELS

Eugene Paul Battaglia, Bronx, N. Y.

Application March 8, 1951, Serial No. 214,547

10 Claims. (Cl. 242—84.5)

This invention relates to anti-backlash attachments for fishing reels and particularly to the type which is intended to prevent entanglement and snarling of the fishing line during and after casting.

The invention contemplates the provision of a simple, spring-operated braking device easily attached to any standard reel and as easily detached therefrom, for sliding and pressing a brake member automatically into engagement with the spool of the reel whenever the line becomes slack, thereby to prevent overrunning of the spool and back-winding and entanglement of the line.

The invention further contemplates the provision of simple means for adjusting the force exerted by the brake-operating spring and consequently adjusting the amount of tension in the line needed to initiate the braking action.

The invention further contemplates the provision of means for adjusting the position of the braking member relatively to the spool or braked member of the reel and thereby controlling the amount of movement of the mechanism required to initiate the braking action.

The invention further contemplates the provision of suitable stops limiting the motion of the member which controls the movement of the brake and of simple means for converting the oscillatory movement of the control member to sliding movement of the brake.

The various objects of the invention will be clear from the description which follows and from the drawings, in which:

Fig. 1 is an elevational view of the attachment as it appears secured to the end plate of a typical fishing reel, the parts being shown in the brake-applying positions thereof, the fishing line and its loop being shown in dash-dot lines in the casting position wherein the brake is released.

Fig. 2 is a fragmentary front elevational view of the attachment as it appears in place on the end plate of the reel.

Fig. 3 is a vertical sectional view of the attachment taken on the line 3—3 of Fig. 1.

Fig. 4 is a vertical sectional view of the attachment taken on the line 4—4 of Fig. 3.

Fig. 5 is a vertical sectional view of the attachment taken on the line 5—5 of Fig. 2 and showing particularly the brake and the means for operating and adjusting the brake.

Fig. 6 is a fragmentary horizontal sectional view of the crank extension of the brake control member and of the recesses in the brake members into which the extension is loosely set.

Fig. 7 is an elevational view of the adjusting screw for the outer brake tube.

Fig. 8 is a similar view of the tube as it appears before the assembly thereof to the recessed brake rod.

In the practical embodiment of the invention shown by way of example, the attachment with the various parts assembled thereto, is removably secured when desired at the periphery of a side wall or end plate 10 of the fishing reel by arranging the edge part of said end plate in the recess 11 made in the under side of the support block 12 and then tightening the clamping screw 14. Said screw terminates in a ball end carrying a swivelled clamping head 15 whereby the taper or inclination which may be present in the end plates of conventional fishing reels of different design, is compensated for and the attachment firmly held in place. To guide the fishing line 16 into its proper winding position on to the usual rotatable spool of the reel as well as to control the operation of the brake soon to be described, a suitable loop as 17 is provided at the end of the brake-control member 25, the loop being preferably of a single piece of round wire bent into rectangular form and having an arm 18 extending therefrom toward the support 12.

The arm 18 connects the loop 17 integrally with the other end portion of the brake-controlling and operating member 25, said arm being preferably doubled back on itself as at 19 to form a stiffened crank extension as best seen in Fig. 6, there being a substantially right angled bend 20 at the inner end of the doubled back crank portion 19, which bend connects said crank portion to the elongated terminal pivot or spindle 21. By means of said spindle, the entire one-piece wire member 25 is pivotally mounted for limited oscillatory movement in and relatively to the support block 12. The spindle 21 is preferably substantially parallel to the plane of the loop 17 and has its bearing in part of the spring-adjusting sleeve 22 which terminates in the enlarged hollow head 23 outside of the support and easily accessible. The spindle is maintained against longitudinal displacement in said sleeve by means of a suitable sheet metal fastener as 24 of the well known split washer type frictionally engaged with the end portion of the spindle and rotatable therewith as a unit inside of the head 23 (Fig. 3). On removal of the washer 24, the member 25 and the brake operated thereby are freed and are easily removed for repair or replacement.

The right hand end portion of the sleeve 22 as viewed in Fig. 3 has a relatively large hole 26 therein to form a relatively thin side wall on the sleeve constituting a housing for the coil spring 27. Said spring is arranged loosely in the hole 26 and has a short preferably radial extension 30 at one end thereof entering the longitudinal groove 31 which extends through the side wall of the sleeve, whereby said end of the spring may be rotated in either direction on the rotation of the sleeve. At its other end, the spring 27 terminates in a suitable loop 32 passed around the crank extension 19 and movable therewith (Figs. 3 and 5) independently of the adjusting movement of the sleeve. Consequently, on rotation of the sleeve as by manipulating the head 23 thereof, the end 30 of the spring is rotated and the spring tightened or loosened as desired to increase or decrease the tension therein, the sleeve being maintained in the adjusted position thereof by the set screw 44 screwed in the support 12 and movable toward and from the sleeve when rotated.

To receive the crank portion 19 and the adjacent part of the arm 18 and to permit limited oscillation thereof, a generally cylindrical recess 33 is made in the support 12 concentric with and at the end of the sleeve, the cylindrical wall of the recess intersecting the adjacent flat side edge surface of the support to provide a pair of parallel spaced stop edges 28 and 29 (Figs. 3 and 5) limiting the amount of the oscillatory movement of the arm 18 in both directions.

Arranged in a suitable hole in the support 12 for sliding movement substantially tangentially to that of the crank portion 19, are the brake parts and the parts for adjusting the brake. As best seen in Figs. 5, 7 and 8, the lower end 36 of the brake adjusting screw 34 is loosely mounted in the upper part of the rod 35 for free rotation therein, by passing said lower end 36 through a suitable hole in said upper part and flaring or peening over said portion 36 at that part thereof which enters the recess 37 of the rod, thereby to hold the screw and rod together against separation but permitting relative rotation thereof. However, said end 36 is not flared or peened until after it has been screwed into the internally threaded upper part of the tube-like brake holder 38 and the rod 35 telescoped within and coaxially of the brake holder with the recessed part of the rod movable in the cut-out intermediate part or recess 41 of the brake tube. When the parts 34, 35 and 38 are so assembled, rotation of the adjusting screw 34 causes relative sliding movement of the telescoped parts. Secured on the lower end of the brake tube 38 as by the pin 43 is the brake member 42 preferably of suitable friction material such as rubber adapted to engage a rotating part of the reel such as the spool as seen in Fig. 2. The inner crank portion of the brake control member 25 is set into and maintained in the recess 37 of the rod 35 (Figs. 5 and 6) so that said portion 19 engages the upper and lower walls of said recess and slides the parts 35 and 38 as a unit tangentially to the movement of the portion 19 to extend or retract the brake tube and its brake member 42 and thereby to operate or release the brake when the loop 17 is moved by the spring 27 or by the fishing line 16.

When the line is tensioned sufficiently, as during casting, the loop 17 becomes lowered to the dash-dot line position thereof shown in Fig. 1 and remains in that position so long as the line remains under tension. The crank portion 19 of the member 25 has consequently moved upwardly from the positions shown in Figs. 1, 2 and 5 in a clockwise direction and has raised the parts 35 and 38 to retract the brake 42 off the spool wall. When however, the line becomes slack, the spring 27 becomes effective to rotate the spindle 21 in a counterclockwise direction as viewed in Figs. 1 and 5 to carry the member 25 into the positions shown in Figs. 1 and 5 and to lower the brake member 42 into pressed contact with the spool until normal tension on the line is restored. By adjusting the screw 34, the brake member may be raised or lowered manually to the desired initial distance from the spool, thereby initiating the braking action sooner or later as desired or on a greater or lesser oscillatory movement of the member 25.

It will now be seen that the attachment may be readily mounted on and removed from any conventional fishing reel having an end plate, that the sliding brake is quickly and easily adjustable and accessible for repair or replacement, that the spring tension is also easily adjustable and that the device is simple, inexpensive and dependable in operation and well designed to carry out its intended purposes.

While a certain specific embodiment of the invention has herein been shown and described, various obvious changes may be made therein without departing from the spirit of the invention defined in the appended claims.

I claim:

1. In a fishing reel attachment, a support, a sleeve rotatably mounted in the support and having a longitudinal groove in the side wall thereof, a set screw for the sleeve in the support, a coil spring housed in the sleeve and having an end portion thereof inserted into the groove, a brake-control member secured to the other end of the spring and having a pivot rotatably mounted in the sleeve, a brake-carrying tube slidably mounted in the support and having a recess therein, a brake member carried by the tube, the brake-control member having a crank portion entering the recess of the tube to slide the tube on oscillation of the crank portion and means for adjusting the longitudinal position of the tube relatively to the support.

2. The attachment of claim 1, the adjusting means comprising an adjusting screw loose in the support and in threaded engagement with the tube and a rod telescopically mounted in the tube and loosely supporting the end of the screw for free rotation therein and having a recess therein receiving the crank portion of the brake-control member.

3. The attachment of claim 2, the rod and the tube sliding as a unit in the support to project the tube beyond the support and to retract the tube toward the support.

4. An attachment for a fishing reel comprising a support having a clamping recess therein, having a first hole therethrough on one side of the recess and having a second sleeve-receiving hole, the axis of the second hole being perpendicular to the axis of the first hole, the support having an enlarged recess therein concentric with and at the end of and greater in diameter than the sleeve-receiving hole, a clamping screw threaded to the support and entering the clamping recess, a headed sleeve rotatable in the second hole, means for fixing the sleeve adjustably against rotation, a pair of telescoped brake-adjusting members in the first hole and each having a recess therein intermediate the ends thereof and substantially registering with the recess of the other brake-adjusting member, a brake member carried by the outer of the brake-adjusting members, a combined loop and crank having a pivot rotatable in and supported by the sleeve and having a crank portion arranged in the recesses of the brake members and on one side of the pivot and having a loop on the other side of the pivot, a spring interposed between the sleeve and the crank portion, and means for adjusting the positions of the telescoped brake-adjusting members relatively to each other.

5. In a fishing reel attachment, a sleeve, a spring housed in the sleeve, a pivot passing through the spring and having a bearing in the sleeve, a crank extension of and on one side of the pivot, an arm projecting from the extension on the other side of the pivot and terminating in a loop for the passage of a fishing line, one end of the spring having a connection to the sleeve and the other end of the spring having a connection to the arm, the spring urging the loop and arm in one direction and tension in the line urging the loop in the opposite direction, a brake member, a slide carrying the brake member and having a recess therein receiving the crank extension and arranged to reciprocate substantially tangentially to the movement of the extension on the oscillation of the loop and arm, means for adjusting the position of the slide, and a support housing the sleeve, pivot, crank extension and slide.

6. The attachment of claim 5 and means for detachably securing the support to a fishing reel, the slide being in the form of a tube, and the slide-adjusting means comprising a rod loose in the tube and loosely and rotatably carrying the inner end of an adjusting screw, and an adjusting screw in threaded engagement with the tube.

7. The attachment of claim 6, the connection of the spring to the sleeve comprising a radial terminal at one end of the spring entering a longitudinal groove in the sleeve and the connection of the spring to the arm comprising a loop at the other end of the spring passing around the crank extension.

8. In a fishing reel attachment, a support, means for removably clamping the support to a reel, a brake slidable in the support, said brake comprising a brake tube internally threaded at one end thereof and a brake member in and projecting from the other end of the tube, the tube having a recess therein intermediate the ends thereof, a spindle pivoted in the support and having a crank extension in the recess to reciprocate the tube, means for adjusting the position of the tube relatively to the support comprising a screw rotatable in the threaded end of the tube and having one end thereof in the recess and in the path of the crank extension, a rod within the tube having an end part thereof secured to and movable longitudinally with said one end of the screw, the rod having a recess therein smaller than the recess of the tube and receiving the crank extension, and means to oscillate the extension to slide the brake tube comprising a loop for the passage of the fishing line of the reel, an arm connecting the loop to the extension and a coil spring in the support and urging the spindle to rotate in a brake-retracting direction when the fishing line is tensioned.

9. The attachment of claim 8, the loop, arm, brake-engaging extension and spindle being of a single piece of wire, a wall of the recess in the rod being in the path of the crank extension.

10. The attachment of claim 9, the support having a recess in an end wall thereof concentric with the spindle and extending sufficiently past the extension to intersect the side wall of the support and to provide an opening in said side wall, said opening being bounded by a pair of parallel spaced stop edges in said side wall, the arm being arranged radially of and across the recess in the support and projecting through the opening in the side wall between said stop edges, said edges limiting the oscillation of the arm in both directions under the influence of the spring and of the tensioned line.

EUGENE PAUL BATTAGLIA.

References Cited in the file of this patent

FOREIGN PATENTS

| Number | Country | Date |
|---|---|---|
| 589,703 | France | Feb. 26, 1925 |
| 607,679 | France | Apr. 13, 1926 |
| 921,411 | France | Jan. 13, 1947 |